UNITED STATES PATENT OFFICE.

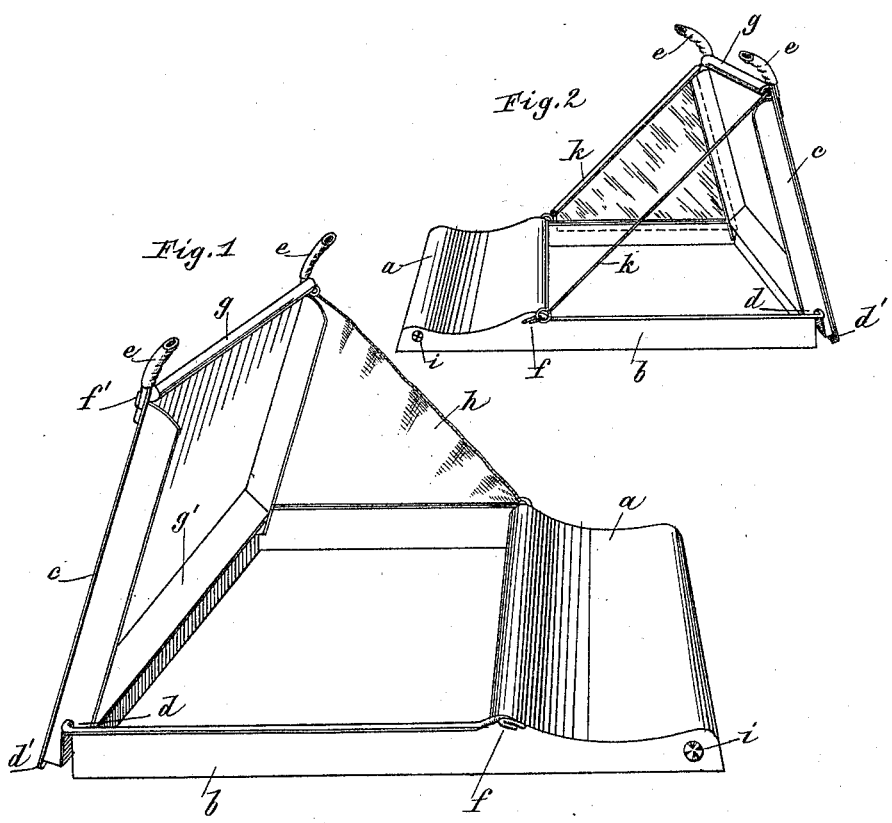

TANKMAR EISFELD, OF GRÖNINGEN, GERMANY.

BED-PAN.

SPECIFICATION forming part of Letters Patent No. 585,349, dated June 29, 1897.

Application filed July 13, 1896. Serial No. 598,943. (No model.)

*To all whom it may concern:*

Be it known that I, TANKMAR EISFELD, doctor of medicine, of 200 Goerkingkstrasse, Gröningen, Prussia, Germany, have invented an Improved Bed-Pan, of which the following is a specification, reference being had therein to the accompanying drawings.

This invention relates to a bed-pan which is suitable for use by adults and in a reduced form for children. In the latter case it is provided with a lid or cover of special construction.

The bed-pan is shown in perspective view at Figures 1 and 2 of the annexed sheet of drawings.

The bed-pan consists of a curved box-rest $a$, made sufficiently strong to prevent its bending, and of a pan $b$ for receiving the excrement. This pan can be closed for removal and sterilization by a substantially tight cover $c$, which is capable of being raised and also of being placed in position against the patient's legs at any desired angle to suit the length of the patient's legs by means of lugs $d\ d'$ at its lower edge. At the upper edge of the lid is a soft roller $g$, on which the patient can rest his legs, and two projections $e$, which prevent the legs slipping sidewise.

To the hooks $f f'$, at both sides of the device, india-rubber cloth $h$ is secured to prevent matter splashing out of the pan and onto the bed.

For children, during their first few years of life, the lid $c$ is also capable of being additionally supported by means of supports $k$, which have pieces of sheet metal $h'$, Fig. 2, secured to them instead of the india-rubber pieces $h$.

The device can be used for all gynecological and obstetrical purposes, when administering injections, for emptying the bladder or the bowels, &c. It is exceedingly clean, as any excrementitious matter splashing onto the lid is guided back into the pan by the ledge $g'$.

All the parts are removable.

The horizontal position of the pan $b$ is insured by the weight of the legs resting on the lid $c$, while backward sliding from the patient is hindered by the curved form of the part $a$, so that the operator can readily manipulate the apparatus.

The pan and its lid can be thoroughly sterilized by boiling.

The form of the pan is such that a sterilizing-box for gynecological instruments can be readily contained within it. The sterilizing is effected by boiling in a solution of soda upon a fire or a spirit-lamp or in a water-bath.

Instead of a sheet-metal box $a$ the curved sheet of metal may alone be used as a resting or bearing surface.

The box $a$ may be provided with a safety-valve $i$ for reducing the pressure due to the boiling operation while sterilizing. The surface of the box may also be provided with supporting-springs.

The lid $c$ and sides can be made all in one piece, in which case it will require to be placed in a slanting position, like a wagon-awning.

What I claim, and desire to secure by Letters Patent of the United States, is—

1. The combination, in a bed-pan, of a box-rest $a$, with a pan $b$ for the reception of the excrementitious matter, and a lid $c$ formed to constitute a leg-rest which is adjustable to any angle to suit the length of the patient's legs, substantially as described.

2. In combination, with the rest $a$, the pan $b$, the lid $c$, and projections $e$, on the edge of the lid for preventing the legs slipping sidewise, substantially as described.

3. In combination, with the rest $a$, the pan $b$, the lid $c$ and side pieces for preventing matter splashing out of the pan and on the bed, substantially as described.

4. In combination with a bed-pan, the lid $c$ and side pieces extending from the lid when raised to the pan for preventing matter splashing out of the said pan, substantially as set forth.

5. In combination with a bed-pan, the lid $c$, the side pieces laterally inclosing the interval between lid and pan when open, means for closing the said lid, and a safety-valve communicating with the interior of said pan, substantially as set forth.

In witness whereof I have hereunto set my hand in presence of two witnesses.

TANKMAR EISFELD.

Witnesses:
 A. K. TINGLE,
 M. L. B. TINGLE.